(12) United States Patent
Vestergaard-Jensen

(10) Patent No.: US 8,528,188 B2
(45) Date of Patent: Sep. 10, 2013

(54) METHOD OF FASTENING FURNITURE POSTS

(76) Inventor: Stephen Vestergaard-Jensen, Bridgeport, CT (US)

( * ) Notice: Subject to any disclaimer, the term of this patent is extended or adjusted under 35 U.S.C. 154(b) by 21 days.

(21) Appl. No.: 13/435,806

(22) Filed: Mar. 30, 2012

(65) Prior Publication Data
US 2012/0186068 A1    Jul. 26, 2012

Related U.S. Application Data

(62) Division of application No. 12/487,836, filed on Jun. 19, 2009, now abandoned.

(51) Int. Cl.
*B21D 39/00* (2006.01)

(52) U.S. Cl.
USPC .................. 29/525.01; 29/525.02; 29/525.11; 403/230

(58) Field of Classification Search
USPC ............... 29/407.09, 407.1, 525.01, 525.02, 29/525.11; 403/230, 231, 238, 256, 258, 403/259, 260, 264, 292, 294, DIG. 13; 312/265.4; 108/156, 158; 211/182, 183; 5/201, 279.1, 282.1; 297/440.1, 440.14; 411/321, 349, 383
See application file for complete search history.

(56) References Cited

U.S. PATENT DOCUMENTS

| 470,995 | A | 3/1892 | Duchemin |
| 4,116,573 | A | 9/1978 | Fuchs |
| 4,299,067 | A | 11/1981 | Bertschi |
| 4,701,065 | A | 10/1987 | Orosa |
| 6,960,045 | B2 | 11/2005 | Schmalzhofer |
| 7,448,820 | B1 | 11/2008 | Faber |

FOREIGN PATENT DOCUMENTS
WO       2009094720       8/2009

*Primary Examiner* — Jermie Cozart
(74) *Attorney, Agent, or Firm* — McCarter & English, LLP

(57) ABSTRACT

The disclosure relates to a fastening device with a stem which is engaged on a first end by a cross-dowel with a transverse threaded aperture and on a second end by a cylinder with a set-screw. The second end of the stem includes an aperture surrounded by an oval-shaped longitudinally elongated countersunk region. This aperture can capture the set-screw within a small range of longitudinal positions, thereby allowing for fine adjustments to be made to align the sidewalls of adjacent post segments joined by the fastening device.

20 Claims, 7 Drawing Sheets

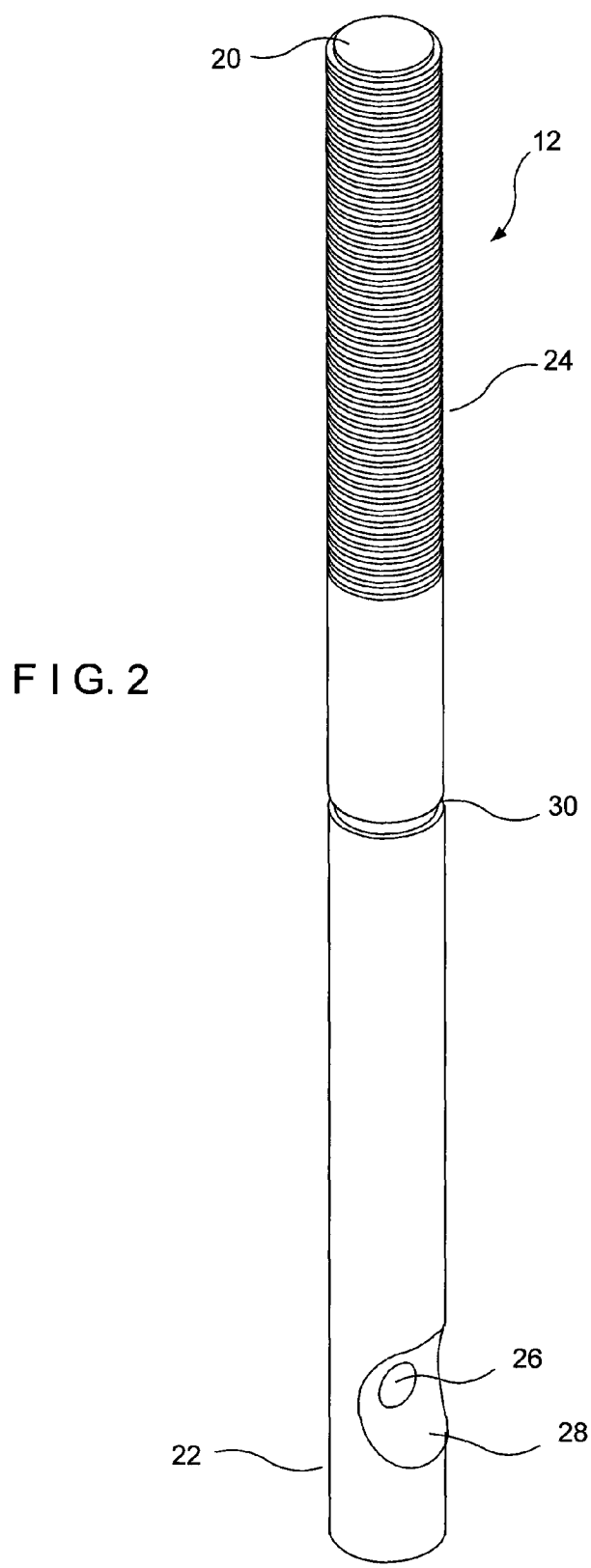
F I G. 2

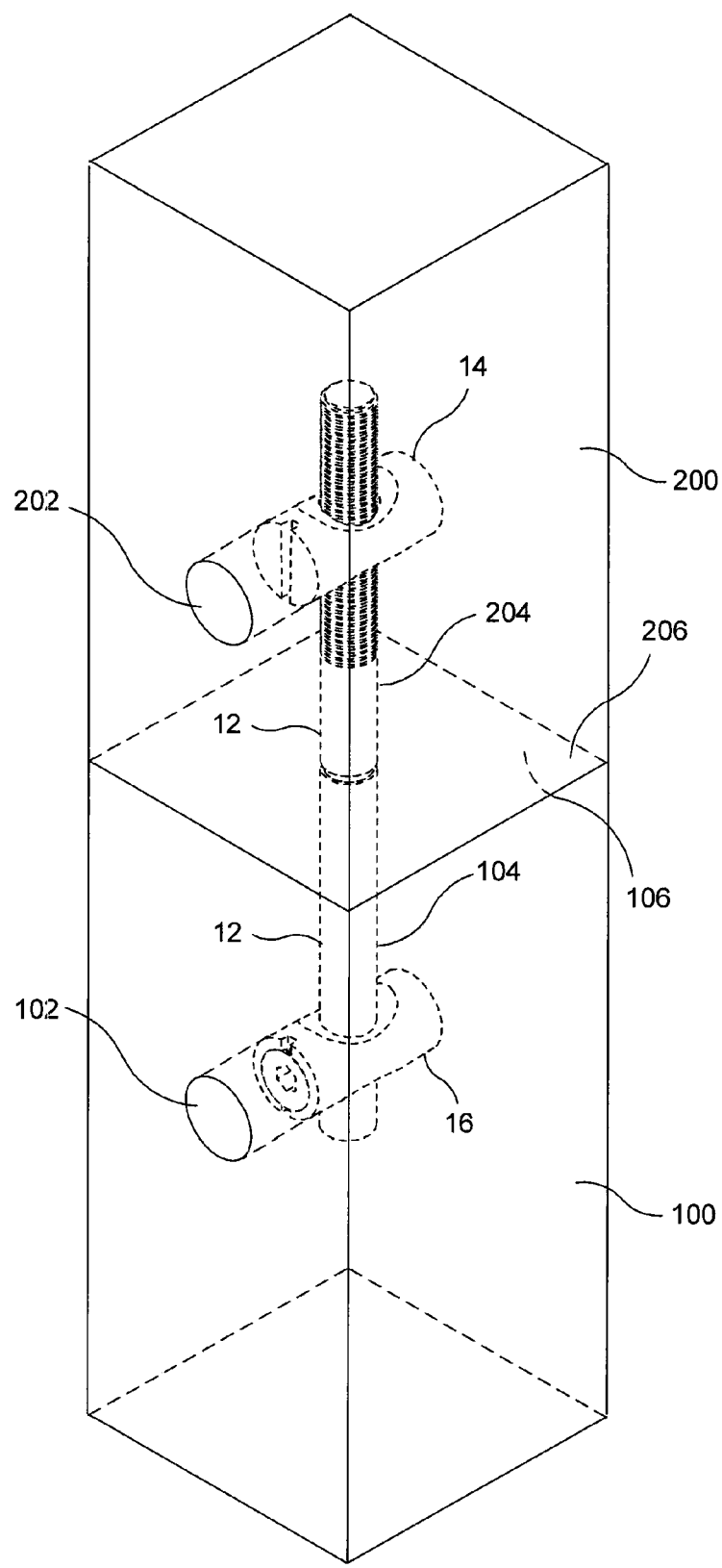
F I G. 5

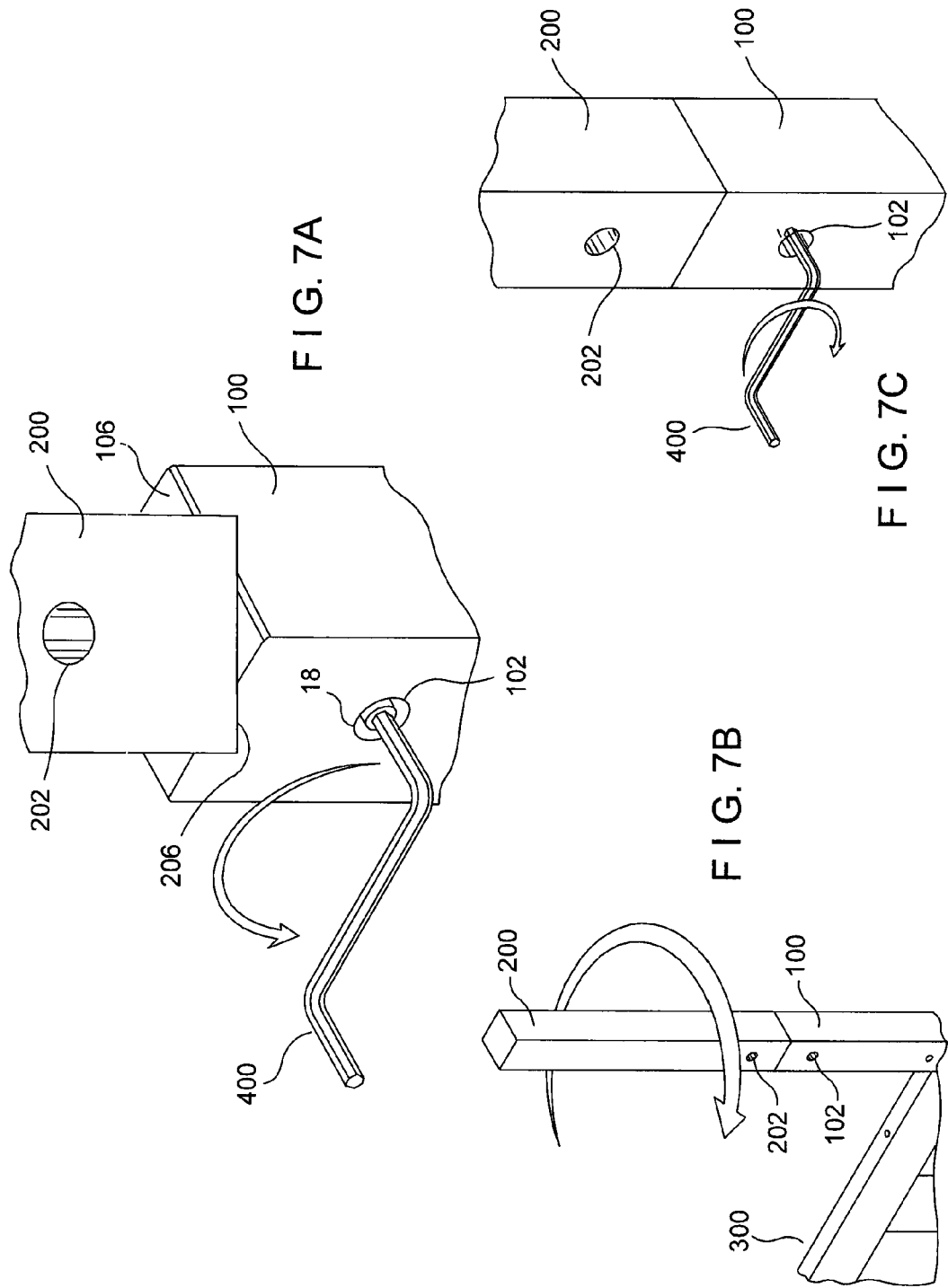

METHOD OF FASTENING FURNITURE POSTS

CROSS-REFERENCE TO RELATED APPLICATION

This application is a divisional of U.S. Ser. No. 12/487,836 filed Jun. 19, 2009 now abandoned. The disclosure of the foregoing applications is herein incorporated by reference in its entirety.

BACKGROUND OF THE INVENTION

1. Field of the Invention

The present invention relates to a fastener for the use in constructing posts for furniture, or similar structures. In particular, the present invention provides the strength of a longitudinally-oriented threaded fastener while allowing for adjustment to align the lateral sides of the posts.

2. Background

In the prior art, it is well known to pack and transport furniture in a disassembled state in order to reduce the packaging volume and to reduce transportation expense. However, this requires the consumer to assemble the furniture, or to incur added expense to have the furniture assembled after purchase. This requires the assembly procedure to be straightforward and simple for a broad range of consumers. More important, however, in the assembly of some furniture, particularly bunkbeds which are designed to hold sleeping children several feet above the floor, it is important that the resulting assembly be fool-proof. While longitudinally-oriented threaded fasteners can provide very reliable strong connections between adjacent portions forming a post for such furniture as a bunkbed, such fasteners may not allow for the satisfactory alignment of the lateral sides of the posts. In other words, when portions of a post of rectangular cross section are connected end-on-end to form a post, it is aesthetically important for the lateral sides to align without sacrificing the strength of the resulting post.

SUMMARY OF THE INVENTION

It is therefore an object of the present invention to provide a strong reliable fastener for securing adjoining post segments together so as to form a post, such as may be used for furniture and similar structures.

It is therefore a further object of the present invention to provide a fastener for securing adjoining post segments together so as to form a post, which is relatively simple and straightforward for the consumer to assemble.

It is therefore a final object of the present invention to provide a fastener for securing adjoining post segments together, wherein the lateral sides of adjoining post segments may be aligned with each other.

These and other objects are attained by providing a fastener which comprises a longitudinal stem with a first half which is threaded and a second half which includes a cross-aperture with a somewhat longitudinally elongated oval-shaped counter-sunk region; a cross-dowel which is inserted laterally into a first post segment and which presents a threaded aperture to the threaded portion of the longitudinal stem; and a cylinder which is inserted laterally into a second post segment and presents an unthreaded aperture for receiving the second half of the longitudinal stem, thereby aligning cross-aperture and the oval-shaped counter-sunk region within the center of the cylinder for receiving a set screw which screws into the cylinder.

The resulting structure presents a very intuitive device which can be easily assembled by the user, resulting in a very strong fastened connection. Further, as will be described herein, the ability of the set screw to engage the longitudinal stem throughout a relatively small longitudinal range (at least equal to the pitch of the threads of the first half of the longitudinal stem) allows an adjustment to be made to align the lateral sides of adjoining post segments.

BRIEF DESCRIPTION OF THE DRAWINGS

Further objects and advantages of the invention will become apparent from the following description and from the accompanying drawings, wherein:

FIG. 2 is a perspective view of a longitudinal stem of an embodiment of the fastener of the present invention.

FIG. 5 is a perspective view, partially in phantom, of an embodiment of the fastener of the present invention, fastening two post segments together.

FIGS. 7A-7C are perspective views illustrating the details of the final assembly steps using the fastener of the present invention.

DETAILED DESCRIPTION

The present fastener invention and method of using the same has the ability, among other things, to not only lock a leg extension or post onto another bed leg or post, but also has the ability to generate extreme compression between the two connecting legs or posts that will make the combined legs or posts rock solid as if the combined legs or posts were one solid piece of wood.

Many prior art devices use pins to place beds on top of each other. The resulting compression between these bed posts, if any, is due to the weight of the bed and gravity. These posts can easily be moved or disconnected by shaking or moving the beds. None of these prior art bed posts allow for such a hard direct compression like the fastener of the present invention.

Figure 1:
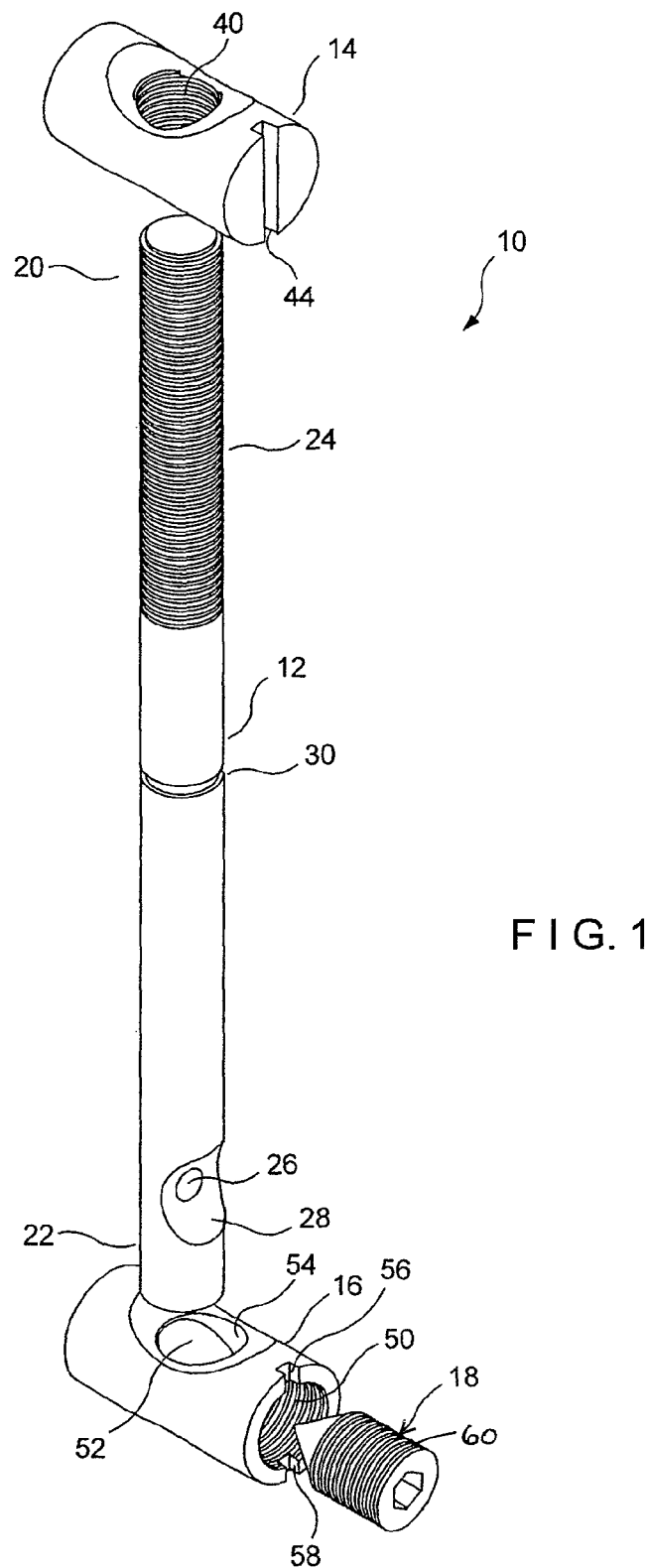
FIG. 1 is an exploded perspective view of an embodiment the fastener of the present invention.

Referring now to the drawings in detail wherein like numerals indicate like elements throughout the several views, one sees an exploded perspective view of an embodiment of fastener 10 in FIG. 1. Fastener 10 includes longitudinal stem 12, cross-dowel 14, cylinder 16, and set-screw 18. All elements of fastener 10 are typically made from stainless steel, although one skilled in the art will recognize a range of equivalents after review of the disclosure.

As shown in FIGS. 1 and 2, longitudinal stem 12 includes a first end 20 and a second end 22. First end 20 includes external threads 24 while second end 22 includes cross-aperture 26 which further includes counter-sunk region 28 which is typically slightly oval-shaped and elongated in the longitudinal direction. Additionally, the middle of the longitudinal stem 12 typically includes a ring-shaped groove or indicator mark 30.

Figure 3:
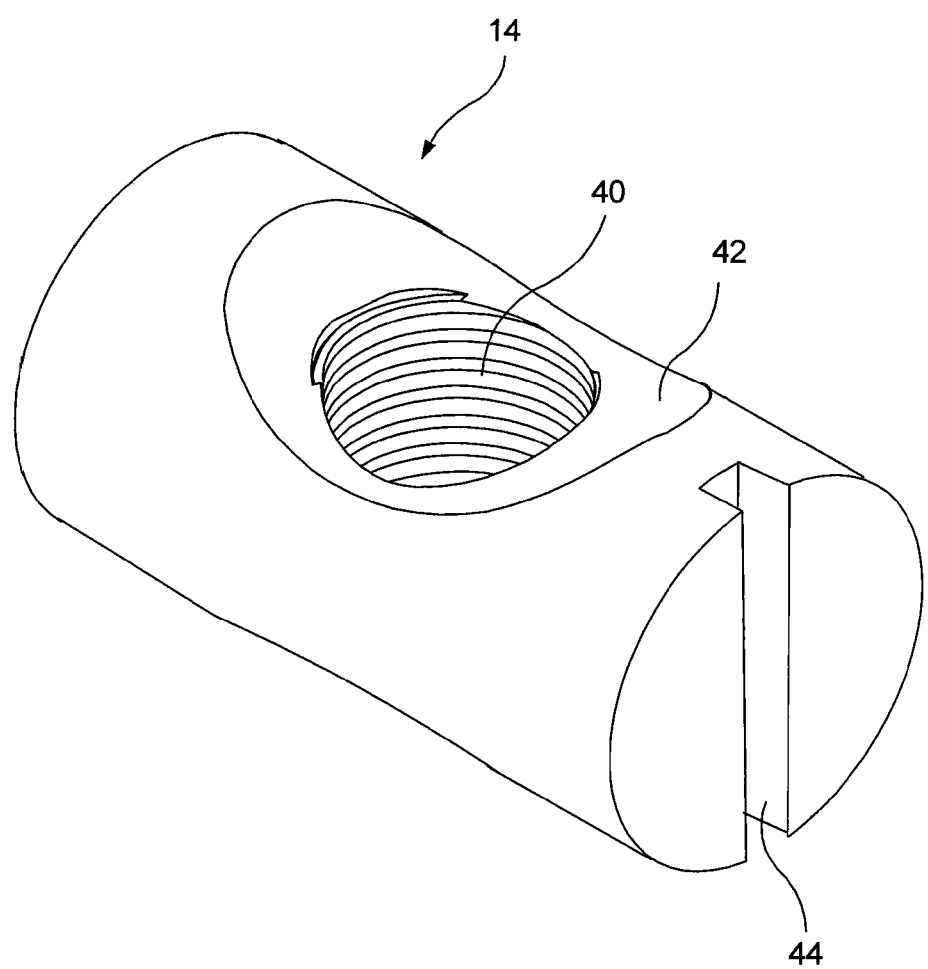
FIG. 3 is a perspective view of a cross-dowel of an embodiment of the fastener of the present invention.

As shown in FIGS. 1 and 3, cross-dowel 14 is cylindrically shaped with a transverse internally threaded aperture 40 for receiving external threads 24 of first end 20 of longitudinal stem 12. Counter-sunk region 42 is formed on the surface of cross-dowel 14 around at least one opening of transverse internally threaded aperture 40 in order to initially capture first end 20 of longitudinal stem 12 throughout a range of deviating angles. Additionally, an end of cross-dowel 14 includes slot 44, resembling that of a flat-head screw, rotationally aligned and positioned with respect to the transverse internally threaded aperture 40, thereby allowing the user to use a conventional flat-head screwdriver to rotate cross-dowel 14 to the desired rotational orientation of internally threaded aperture 40 for capture of external threads 24 of first end 20 of longitudinal stem 12.

Figure 4:
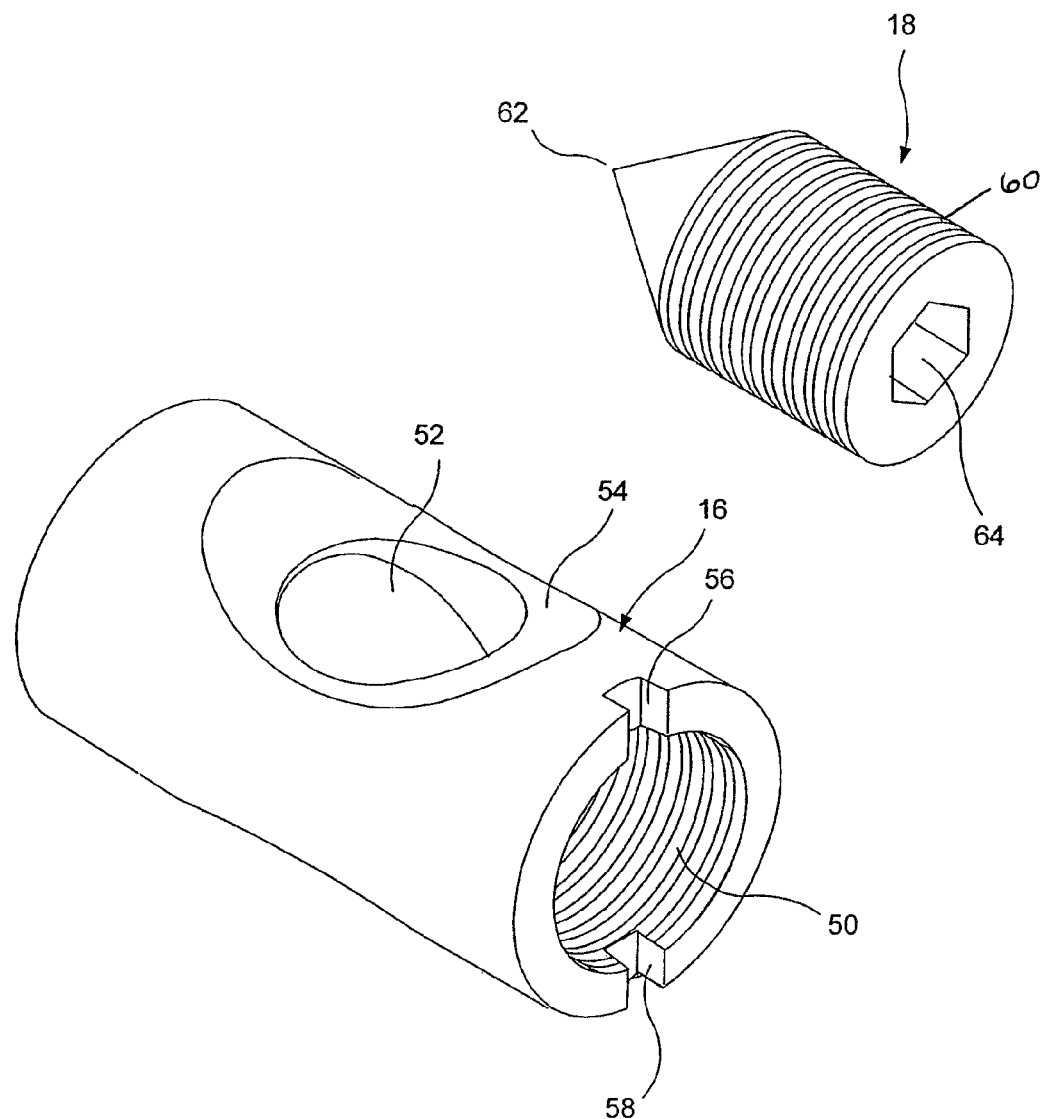
FIG. 4 is a perspective view of a cylinder and set-screw of an embodiment of the fastener of the present invention.

As shown in FIGS. 1 and 4, cylinder 16 is hollow with internally threaded longitudinal aperture 50. Cylinder 16 further includes transverse passageway 52 with an opening surrounded by oval-shaped countersunk region 54. The edge of cylinder 16 includes slots 56, 58 which are radially aligned with each other thereby forming a detent with which the user can use a flat-head screwdriver to rotate cylinder 16 so that transverse passageway 52 can be rotationally aligned to receive second end 22 of longitudinal stem 12. Similarly, slots 56, 58 are rotationally aligned and positioned so as to indicate the orientation of transverse passageway 52. FIGS. 1 and 4 likewise illustrate set-screw 18 which includes external threads 60 which are complementary to the external threads of aperture 50. Set-screw 18 further includes pointed tip 62 and hex-tool receiving aperture 64 for receiving a hex-tool 400 such as that illustrated in FIGS. 7A and 7C.

Figure 6:
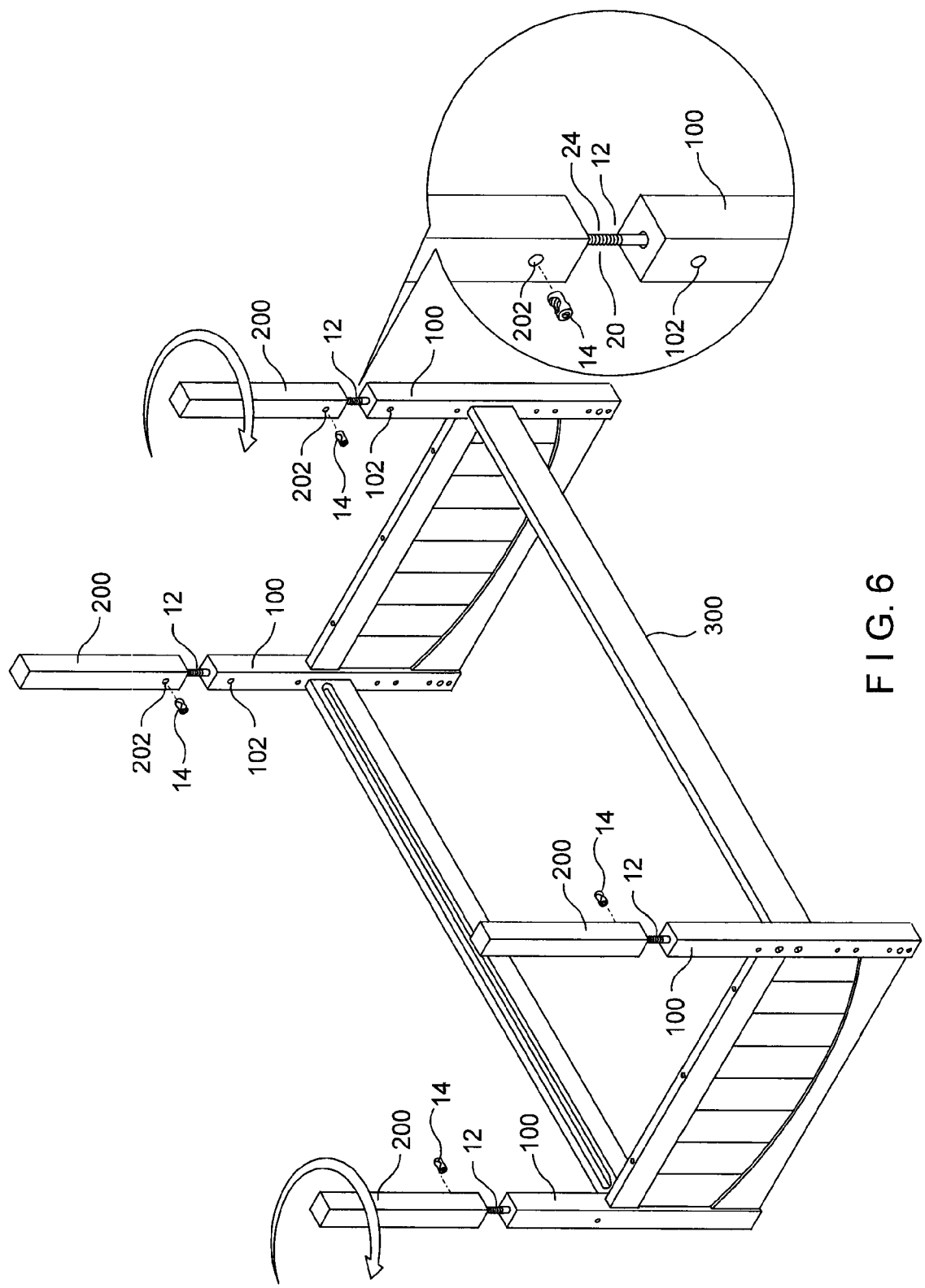
FIG. 6 is a perspective view, partially exploded, of an embodiment of the fastener of the present invention being used to assemble a child's bed.

The installation process of fastener 10 with respect to post segments 100, 200 can be explained by reference to FIGS. 5, 6 and 7A-7C. As shown in FIG. 6, post segment 100 can extend from the frame of bed 300 while post segment 200 provides the length of the leg or post of bed 300. The user first inserts cylinder 16 into transverse blind aperture 102 of post segment 100. Transverse blind aperture 102 is dimensioned so that cylinder 16 can be fully inserted or seated within transverse blind aperture 102. The user then uses a flat-head screwdriver or similar tool to rotate cylinder 16 so that transverse passageway 52 is aligned with longitudinal blind aperture 104 of post segment 100. The user then inserts second end 22 of longitudinal stem 12 into longitudinal blind aperture 104, typically to the depth that ring-shaped groove or indicator mark 30 is flush with the end 106 of post segment 100. The user then inserts set-screw 18 into internally threaded longitudinal aperture 50 and uses a hex-tool to screw set-screw 18 therein. The user may have to rotate longitudinal stem 12 appropriately so that pointed tip 62 of set-screw 18 is captured within counter-sunk region 28 and cross-aperture 26 of longitudinal stem 12. The user assures that set-screw 18 is inserted sufficiently to insure that stem 12 is securely engaged both rotationally and longitudinally. The user then inserts cross-dowel 14 into transverse blind aperture 202 of post segment 200. Transverse blind aperture 202 is dimensioned so that cross-dowel 14 can be fully inserted or seated within transverse blind aperture 202. The user then uses a flat-head screwdriver or similar tool to rotate cross-dowel 14 so that transverse internally threaded aperture 40 is aligned with longitudinal blind aperture 204 of post segment 200. The user then inserts the first end 20 of longitudinal stem 12, which is protruding from longitudinal aperture 104 of post segment 100, into longitudinal aperture 204 of post segment 200 so that external threads 24 of longitudinal stem 12 are captured within transverse internally threaded aperture 40 of cross-dowel 14. The user then rotates at least one of post segments 100, 200 to thread longitudinal stem 12 into cross-dowel 14 until the ends 106, 206 of respective post segments 100, 200 abut each other. However, in the very likely event that the lateral sides of post segments 100, 200 are not satisfactorily aligned with each other as illustrated in FIG. 7A, the user partially unscrews or "backs out" the set-screw 18 using hex-tool 400 as shown in FIG. 7A to allow a small degree of longitudinal movement of longitudinal stem 12. Typically, the amount of longitudinal freedom of movement required for longitudinal stem 12 is typically no greater than about one pitch distance of the external threads 24. Additionally, set-screw 18 remains inserted to an extent sufficient to prevent free rotation of longitudinal stem 12. The user then can rotate at least one of post segments 100, 200 so that the ends 106, 206 abut each other and the sides of post segments 100, 200 are properly aligned as shown in FIG. 7B. This causes post segment 200 to torque and compress against post segment 100 thereby causing a very tight compression between the post segments 100, 200. The user then re-tightens set-screw 18. As the counter-sunk region 28 and cross-aperture 26 of longitudinal stem 12 can be engaged by set-screw 18 through a range of longitudinal positions (the range equal to at least the pitch distance of external threads 24) by turning the hex-tool 400 as illustrated in FIG. 7C, possibly followed by additional torquing of post segment 100 for compression of the posts. This compression of posts results in a very strong and aesthetic engagement of post segments 100, 200 into a post structure suitable for many uses, including, but not limited to, bunkbeds and other kinds of furniture.

Thus the several aforementioned objects and advantages are most effectively attained. Although preferred embodiments of the invention have been disclosed and described in detail herein, it should be understood that this invention is in no sense limited thereby and its scope is to be determined by that of the appended claims and their equivalents.

What is claimed is:

1. A method of fastening furniture posts, comprising:
   inserting a first cylinder into a first post that defines at least one insertion hole; said first cylinder having a first aperture;
   inserting a stem into said first aperture; said stem having an indicator mark to confirm said mark is flush with an end of said first post;
   inserting a set-screw into said first cylinder;
   inserting a second cylinder into a second post that defines at least one insertion hole; said second cylinder having a second aperture;
   inserting an end of said stem that is protruding from said first post into the second aperture of said second cylinder that is within said second post;
   rotating at least one of said posts to thread said stem into said second cylinder; and
   tightening said set-screw at said first cylinder to an extent sufficient to prevent free rotation of said stem.

2. The method of claim 1, wherein the inserting a stem further includes:
   positioning said stem, having a counter-sunk region for receiving said set screw, along a range of positions in said first aperture; and
   aligning said set screw with said stem by confirming said indicator mark on said stem is flush with the end of said first post.

3. The method of claim 2, wherein the rotating at least one of said posts to thread said stem into said second cylinder further includes:
   confirming said indicator mark on said stem is flush with an end of said second post.

4. The method of claim 2, further including:
   transversely orienting said stem with said first and second cylinder, respectively.

5. The method of claim 2, further including:
orientating said first and second cylinder parallel to each other in said first and second posts, respectively.

6. The method of claim 2, further including:
aligning along a common axis both a first and a second tool-engaging slots defined on ends of said first and second cylinders, respectively, to align said first and second apertures for receiving said stem.

7. The method of claim 2, further including:
rotating said first and second cylinders to align first and second tool-engaging slots defined on ends of said first and second cylinders.

8. A method of fastening furniture posts, comprising:
inserting a first cylinder into a first post that defines at least one insertion hole; said first cylinder having a first unthreaded aperture which is transversely oriented to said cylinder;
inserting a stem longitudinally into said first aperture; said stem having an indicator mark to confirm said mark is flush with an end of said first post;
inserting a set-screw into an end of said first cylinder;
tightening said set-screw to hold said stem in said first post;
inserting a second cylinder into a second post that defines at least one insertion hole; said second cylinder having a second threaded aperture which is transversely oriented to said second cylinder and longitudinally oriented internally threaded;
inserting an end of said stem that is protruding from said first post into the second aperture of said second cylinder that is within said second post;
rotating at least one of said posts to thread said stem into said second cylinder; and
re-tightening said set-screw at said first cylinder to an extent sufficient to prevent free rotation of said stern.

9. The method of claim 8 further includes aligning a first tool-engaging slot longitudinally with said stem to prepare tightening of said set-screw with said stem.

10. The method of claim 8 further includes orienting said set screw with an internally threaded passageway at an end of said first cylinder before securing said set-screw in said first cylinder.

11. The method of claim 8 further includes engaging said set screw along a range of longitudinal positions of said stem in said first cylinder.

12. The method of claim 11 further includes engaging said set screw in a first counter-sunk region at an end of said stem.

13. The method of claim 12 wherein said first counter-sunk region is oval-shaped, and longitudinally elongated along said stem.

14. The method of claim 8 further includes rotating a first tool-engaging slot at the end of said first cylinder to align said first aperture longitudinally with said stem.

15. The method of claim 14 further includes rotating a second tool-engaging slot at the end of said second cylinder to align said second aperture longitudinally with said stem.

16. The method of claim 8 further includes rotating a first tool-engaging slot at the end of said first cylinder to indicate a rotational position of said internally unthreaded aperture.

17. The method of claim 8 further includes rotating a second tool-engaging slot at the end of said second cylinder to indicate a rotational position of said internally threaded aperture.

18. A method of fastening furniture posts, comprising:
inserting a first cylinder into a first post that defines at least one insertion hole; said first cylinder having a first unthreaded aperture which is transversely oriented to said cylinder;
rotating a first tool-engaging slot at the end of said first cylinder to align longitudinally with the length of the first post;
inserting a stem longitudinally into said first aperture; said stem having an indicator mark to confirm said mark is flush with an end of said first post;
inserting a set-screw into an end of said first cylinder;
tightening said set-screw to hold said stem in said first post;
inserting a second cylinder into a second post that defines at least one insertion hole; said second cylinder having a second threaded aperture which is transversely oriented to said second cylinder and longitudinally oriented internally threaded;
rotating a second tool-engaging slot at the end of said second cylinder to align longitudinally with the length of the second post;
inserting an end of said stem that is protruding from said first post into the second aperture of said second cylinder that is within said second post;
rotating at least one of said posts to thread said stem into said second cylinder; and
re-tightening said set-screw at said first cylinder to an extent sufficient to prevent free rotation of said stem.

19. The method of claim 18 further includes longitudinally aligning said first tool-engaging slot with said second tool-engaging slot before inserting said stem in said first aperture.

20. The method of claim 18 further includes rotating said posts until the ends of said first and second posts are substantially aligned.

* * * * *